(12) United States Patent
Wocial

(10) Patent No.: US 11,614,025 B1
(45) Date of Patent: Mar. 28, 2023

(54) SYSTEM AND METHOD FOR THERMAL MANAGEMENT

(71) Applicant: Transportation IP Holdings, LLC, Norwalk, CT (US)

(72) Inventor: Wioleta Wocial, Warsaw (PL)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/499,349

(22) Filed: Oct. 12, 2021

(51) Int. Cl.
 *F01P 11/14* (2006.01)
 *F02D 35/00* (2006.01)

(52) U.S. Cl.
 CPC .............. *F01P 11/14* (2013.01); *F02D 35/00* (2013.01); *F01P 2025/04* (2013.01)

(58) Field of Classification Search
 CPC .. F01P 11/14; F01P 11/18; F01P 11/02; F02D 35/00
 See application file for complete search history.

(56) References Cited

U.S. PATENT DOCUMENTS

| | | | | |
|---|---|---|---|---|
| 4,494,402 A * | 1/1985 | Carney | ................... | G01M 3/26 73/40 |
| 4,649,869 A * | 3/1987 | Hayashi | ................... | F01P 11/18 123/41.31 |
| 4,688,627 A * | 8/1987 | Jean-Luc | ............... | G01M 3/228 73/40.7 |
| 5,320,196 A * | 6/1994 | Mouton | ................... | F16N 29/00 184/104.1 |
| 5,656,771 A * | 8/1997 | Beswick | .................. | F01P 11/14 340/451 |
| 6,742,535 B1 * | 6/2004 | Knowles | ................... | F01P 11/14 137/205 |
| 2002/0062862 A1 * | 5/2002 | Knowles | .............. | B67D 7/3209 137/205 |
| 2009/0301409 A1 * | 12/2009 | Dahl | ....................... | F01P 7/167 123/41.1 |
| 2015/0330256 A1 * | 11/2015 | Adachi | ..................... | F01K 7/16 60/646 |
| 2016/0178260 A1 * | 6/2016 | Geskes | .................. | F25B 39/024 62/515 |
| 2019/0056147 A1 * | 2/2019 | Brisebois | ................. | F24S 50/00 |
| 2020/0063638 A1 * | 2/2020 | Lee | ....................... | F01P 11/0238 |
| 2022/0221045 A1 * | 7/2022 | Honjo | ................. | F16H 57/0413 |

* cited by examiner

*Primary Examiner* — Long T Tran
(74) *Attorney, Agent, or Firm* — The Small Patent Law Group LLC; Josef L. Hoffmann

(57) ABSTRACT

A system is provided that may include a pressure sensor coupled to a radiator. The pressure sensor may determine plural pressure readings of a radiator fluid in the radiator. The system may also include a vehicle controller of a vehicle system that includes one or more processors. The one or more processors may repeatedly determine the plural pressure readings of the radiator fluid, and determine a pressure variance of the plural pressure readings that is repeatedly determined. The one or more processors may further be configured to identify a pressure condition based on the pressure variance that is determined.

20 Claims, 4 Drawing Sheets

SYSTEM AND METHOD FOR THERMAL MANAGEMENT

BACKGROUND

Technical Field

The subject matter described herein relates to a system and method for a cooling system.

Description of the Art

Some thermal management systems may include a radiator. A typical radiator may include radiator fluid, or coolant, and may be used for cooling an engine. Radiator fluid may convey heat from the engine to an outside environment. A radiator cap may control the pressure in the radiator. When the radiator cap is faulty, or when a coolant leak exists in the radiator, the engine can overheat. When an engine overheats, engine efficiency may decrease. It may be desirable to have a system and method that differs from those that are currently available.

BRIEF DESCRIPTION

In accordance with one embodiment, a system is provided that may include a pressure sensor coupled to a radiator. The pressure sensor may determine plural pressure readings of a radiator fluid in the radiator. The system may include a vehicle controller of a vehicle system that includes one or more processors. The one or more processors may determine the plural pressure readings of the radiator fluid, and determine a pressure variance of the plural pressure readings that is repeatedly determined. The one or more processors may identify a pressure condition based on the pressure variance that is determined.

In accordance with one embodiment, a system is provided that may include a vehicle controller of a vehicle system. The vehicle controller may include one or more processors that may repeatedly determine plural pressure readings of radiator fluid in a radiator during a trip. The one or more processors may determine a pressure variance of the plural pressure readings that is repeatedly determined and identify a pressure condition based on the pressure variance that is determined during the trip.

In accordance with one embodiment, a computer implemented method is provided that can include determining plural pressure readings of radiator fluid repeatedly during a trip. The method may include determining a pressure variance of the plural pressure readings that may be repeatedly determined during the trip, and identifying a pressure condition based on the pressure variance that may be determined during the trip.

BRIEF DESCRIPTION OF THE DRAWINGS

The inventive subject matter may be understood from reading the following description of non-limiting embodiments, with reference to the attached drawings, wherein below.

DETAILED DESCRIPTION

The subject matter described herein relates to a system and method for thermal management. An embodiment described herein relates to a system that monitors the pressure variance in a radiator to determine if a leak exists in the radiator or radiator cap. The system may obtain pressure readings from a sensor of a radiator.

During operation of a properly operating radiator, the pressure variance can range between +/− five (5) pounds per square inch (psi). However, when a leak is occurring in the radiator, radiator cap, etc., the variance may drop to only one (1) psi. Thus, a threshold pressure, that in one example may be 1 psi, can be monitored, and if the threshold pressure is not exceeded for a determined period of time, then a pressure condition is identified. The pressure condition is indicative of a leak, and as a result, a communication can be provided to an operator that warns of the pressure condition. To this end, the system may communicate to a remote controller, such as a maintenance controller, dispatch controller, or the like, to schedule a check and/or maintenance for the radiator. In this manner, a leak is identified by the system before significant damage to the vehicle system results from overheating.

Figure 1:
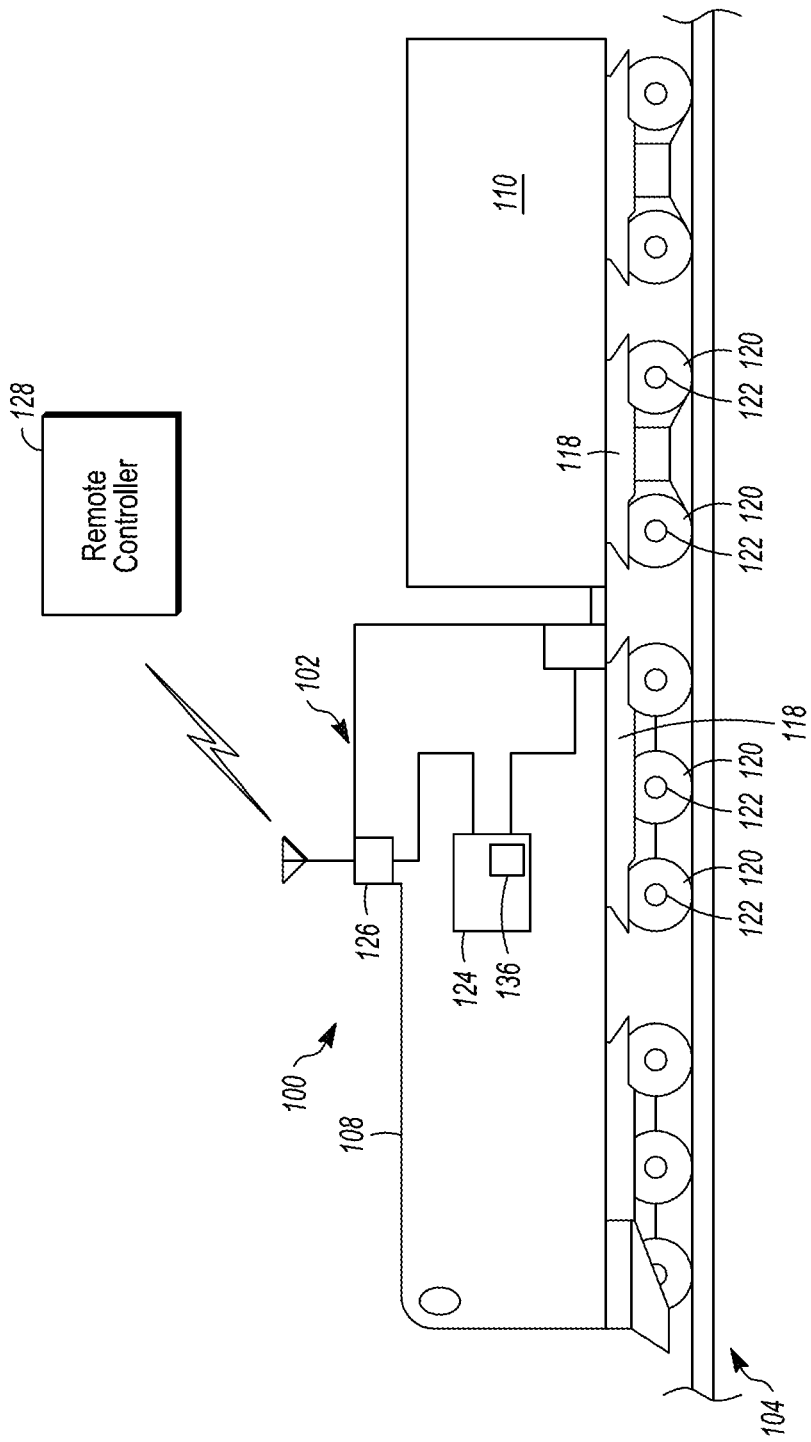
FIG. 1 is a schematic view of a vehicle system.

FIG. 1 illustrates a schematic diagram of one example of a vehicle system 100. While FIG. 1 illustrates the vehicle system as a rail vehicle, in other examples, the vehicle system can include automobiles, marine vessels, airplanes, off road vehicle, construction vehicles, vehicles in a fleet, or the like. In particular, a vehicle system may include a single vehicle or two or more vehicles. The vehicle system may travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. Alternatively, the vehicle system may be formed of only a single propulsion-generating vehicle.

The propulsion-generating vehicle may generate tractive efforts to propel (for example, pull or push) the vehicle system along routes. The propulsion-generating vehicle includes a propulsion system, such as an engine, one or more traction motors, and/or the like, that operate to generate tractive effort to propel the vehicle system. Although one propulsion-generating vehicle and one non-propulsion-generating vehicle are shown in FIG. 1, the vehicle system may include multiple propulsion-generating vehicles and/or multiple non-propulsion-generating vehicles. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles in the vehicle system are logically or virtually coupled together, but not mechanically coupled together.

The propulsion-generating vehicle includes one or more other operating systems 112 that control the operation of the vehicle system. In one example, the operating system is a radiator that includes coolant, or radiator fluid used to convey heat from the engine to the outside environment. Alternatively, the operating system may be a braking system, a bearing system, a wheel and axle system, or the like.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. In one embodiment, the vehicle system may not include axles, such as in some mining vehicles, electric vehicles, etc.

The vehicle system may include a vehicle controller 124 that may further include a wireless communication system 126 that allows wireless communications between vehicles in the vehicle system and/or with remote locations, such as the remote controller 128. The remote controller may be a dispatch controller, maintenance controller, or the like. The communication system may include a receiver and a transmitter, or a transceiver that performs both receiving and transmitting functions. The communication system may include an antenna and associated circuitry.

The vehicle system may include a locator device 136. The locator device may be positioned on the vehicle system, utilize wayside devices, etc. In one example, the locator device is a global navigation satellite system (GNSS) receiver, such as a global positioning system (GPS) receiver that receives signals from remote sources (e.g., satellites) for use in determining locations, movements, headings, speeds, etc., of the vehicles, and can provide position data related to the vehicle system. Alternatively, the locator device may use Wi-Fi, Bluetooth-enabled beacons, near-field communication (NFC), radio frequency identification (RFID), QR code, etc. to provide location information. In particular, during a trip, the vehicle system may traverse from a starting location to an ending location. In one example, the trip may include a first location that is the starting location and a second location that is a determined distance from the ending locations. In particular, the second location may be the distance based on how much time preparation for maintenance and repair is desired. In one example, the second location may be fifty (50) miles prior to reaching the end location. In this manner, when the locator device determines the vehicle system is at the second location 50 miles from the ending location, a determination can be made if maintenance or repair is required such that a communication signal can be transmitted to a remote controller that is a maintenance controller at the end location. This communication allows preparation at the maintenance controller to reduce maintenance time.

Figure 2:
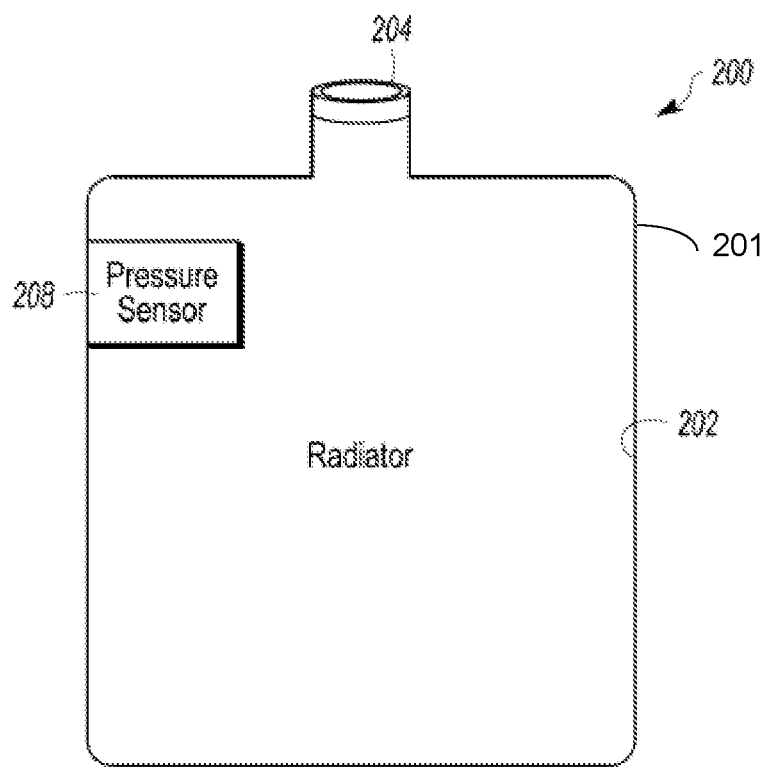
FIG. 2 is a schematic view of a radiator.

FIG. 2 illustrates a cooling system 200 of the vehicle system. The cooling system can include a radiator 201 of the vehicle system of FIG. 1. In other embodiments the radiator may be a radiator of a rail vehicle, automobile, off-road vehicle, mining vehicle, tractor, aquatic vehicle, airplane, etc. The radiator includes a container 202 that may hold a volume of coolant (e.g., radiator fluid) used to convey heat from an engine (not shown) to the environment. The radiator includes a removable cap 204 coupled to the container. The removable cap may be coupled to provide a pressure seal within the container. The radiator 200 may include at least one pressure sensor 206 that may determine the pressure of the radiator fluid. Optionally, this determination may be done repeatedly. In one example, the pressure sensor determines the pressure of the radiator fluid periodically, such as once every second, five second, ten seconds, minute, or the like. Alternatively, the pressure sensor determines the pressure of the radiator fluid irregularly (e.g. not periodically), at random times, on demand, etc. In one example, the frequency of determining the pressure of the radiator may dynamically change based on changes in the pressure. For example, the determination may be made one every ten seconds until a change in pressure is detected, at which point the determination can be made once every five seconds until the pressure regulates. In another example, the pressure readings may be differentiated by revolutions per minute (RPM) values. So, for every two revolutions per minute a pressure reading may be obtained.

The pressure sensor may be coupled to, or disposed entirely in the container, on the container, partially within the container, coupled to the cap, coupled spaced from the cap, or the like. The pressure sensor may be electrically coupled to control system (FIG. 3) for processing signals generated by the pressure sensor.

Figure 3:
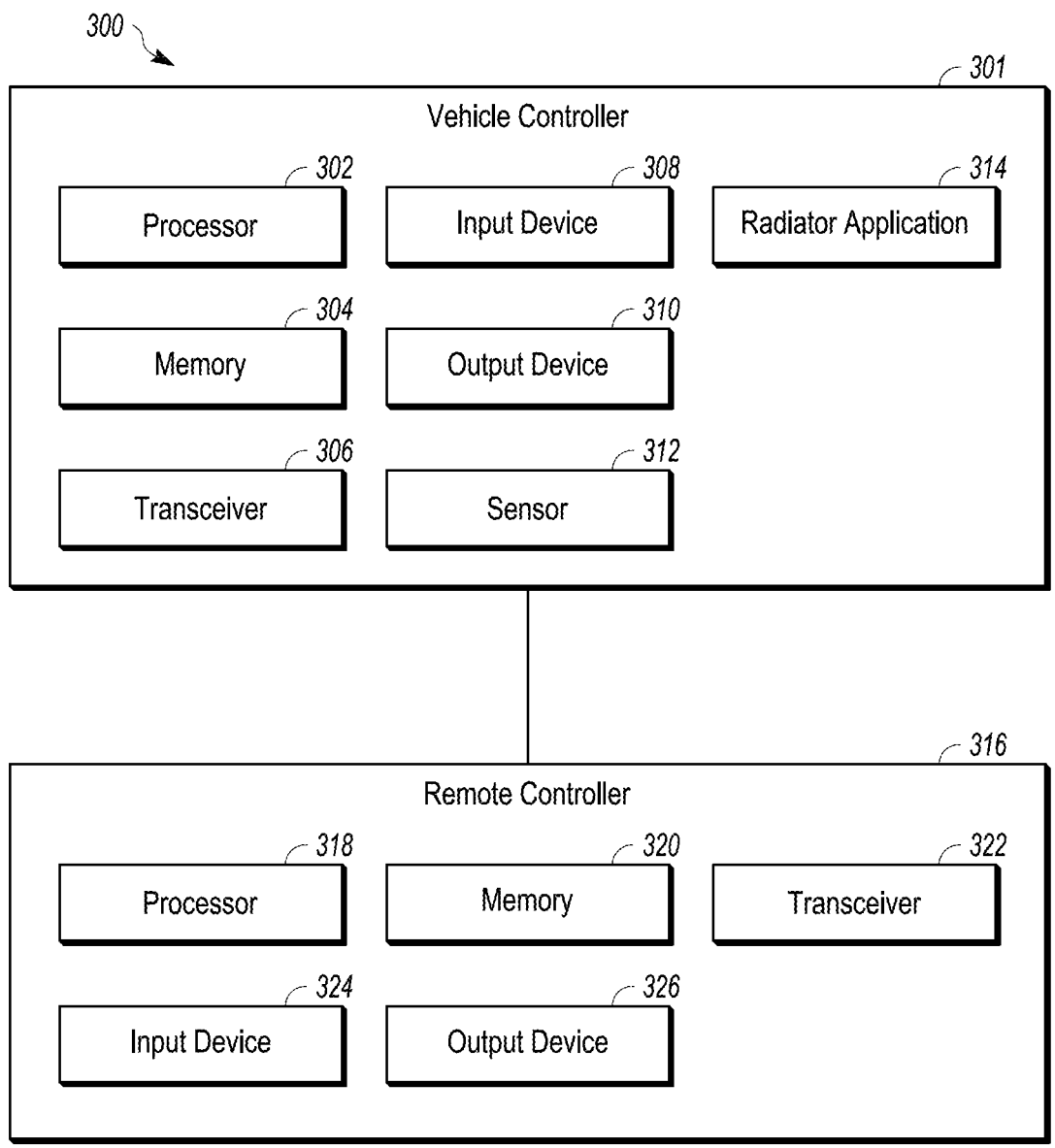
FIG. 3 is a schematic view of a control system of a vehicle system.

FIG. 3 provides a schematic illustration of a control system 300 of a vehicle system, such as the vehicle system shown in FIG. 1. In one example, the control system includes a vehicle controller 301 that in one example is the vehicle controller of FIG. 1. The vehicle controller includes one or more processors 302 (microprocessors, integrated circuits, field programmable gate arrays, etc.). The one or more processors may receive location data, operating data from operation systems, or the like. Based on receiving data related to the vehicle system, the one or more processors make determinations related to the health of operating systems such as a cooling system, and whether communication needs to be made for maintenance and repair of a component of the cooling system. For example, if the pressure is detected as not varying a desired amount, a communication may be broadcast that the cooling system needs to be checked, including the radiator cap.

The vehicle controller may include a memory 304, which may be a tangible, non-transitory, electronic, computer-readable storage device or medium, such as a computer hard drive, removable disc, or the like. The vehicle controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The memory may be used to store information related to location data, movement data, historical data, route data, vehicle data etc. The memory may then be used by the one or more processors to access data for making determinations related to the health of each vehicle system, including the health of each operating system the vehicle system. In one example, data is logged into a document related to a vehicle system. In another example, data, such as a video feed, may be recorded and stored in the memory for later analysis. In addition, algorithms, applications, models, or the like may be stored within the memory to be used by the one or more processors in making determinations related to the health of vehicle systems within the area.

In one example, the vehicle controller memory may be within a housing of the vehicle controller, or alternatively may be on a separate device that may be communicatively coupled to the vehicle controller and the one or more processors therein. By "communicatively coupled," it is meant that two devices, systems, subsystems, assemblies, modules, components, and the like, are joined by one or more wired and/or wireless communication links, such as by one or more conductive (e.g., copper) wires, cables, or buses; wireless networks; fiber optic cables, and the like.

The vehicle controller may include a transceiver 306 that may communicate with remote controllers including dispatch controllers, maintenance controllers, etc. The transceiver may be a single unit or be a separate receiver and transmitter. In one example, the transceiver may only transmit signals, but alternatively may send (e.g., transmit and/or broadcast) and receive signals.

The vehicle controller may include an input device 308 and an output device 310. The input device may be an interface between an operator, or monitor, and the one or more processors. The input device may include a display or touch screen, input buttons, ports for receiving memory devices, etc. In this manner, an operator may manually provide parameters into the controller, including vehicle parameters, route parameters, and trip parameters. Similarly, the output device may present information and data to an operator, or provide prompts for information and data. The output device may similarly be a display or touch screen. In this manner, a display or touch screen may be an input device and an output device.

The vehicle controller may include one or more sensors 312 disposed within and adjacent the area to detect movement data, area data, vehicle data, route data, etc. The one or more sensors may be pressure sensors, temperature sensors, speed sensors, voltmeters, angular speed sensors, etc. In one example, at least one sensor is a pressure sensor used to determine the pressure of the radiator fluid within a radiator. The pressure sensor may be on a radiator, in a radiator, associated with a radiator, or the like. In particular, signals from the pressure sensor may be used to determine pressure variance in the radiator. In another example, the one or more sensors may be the pressure sensor as described in relation to FIG. 2.

In another example, the one or more sensors may include a locator device. In one example, the locator device is a GNSS receiver, such as a GPS receiver that receives signals from remote sources (e.g., satellites) for use in determining locations, movements, headings, speeds, etc., of the vehicles, and can provide position data related to the vehicle system. Alternatively, the locator device may use Wi-Fi, Bluetooth-enabled beacons, near-field communication (NFC), radio frequency identification (RFID), QR code, etc. to provide location information. The locator device may determine where a vehicle system is at during a trip having a starting location and an ending location. In one example, a trip may include a first location and a second location where the first location is a starting location. The second location may be at a point prior to the ending location. By communicating signals related to maintenance or repair of an operating system such as a radiator prior to or at the second location, the scheduling of the maintenance and repair can occur before the vehicle system even reaches the end location where repair or maintenance can occur. To this end, when the sensor is a locator device, the locator device can determine when the vehicle system reaches the second location to ensure any maintenance or repair that needs to occur is scheduled before the vehicle system arrives at the repair and maintenance location.

The vehicle controller can additionally include a radiator application 314 for determining the health of the radiator of the vehicle system. The radiator application may include one or more instructions that may be executed by the one or more processors to direct operations of the processor(s). In one example, the radiator application may be stored in the memory. The radiator application may obtain pressure data from a pressure sensor of the radiator. The radiator application then utilizes the numerous pressure readings repeatedly taken by the pressure sensor during a trip of a vehicle system along a route to determine a pressure variance.

In one example, the radiator application utilizes the numerous pressure readings to determine the pressure variance by comparing the pressure readings to one another. In particular, the difference between individual readings may be determined, such that if a first reading is twenty (20) psi and the second reading is twenty-two (22) psi, the pressure variance is two (2) psi. So, if a third pressure reading is provided that is twenty-seven (27) psi, the pressure variance between the first reading and third reading is seven (7) psi, while the pressure variance between the second reading and third reading is five (5) psi. In one example, each reading after the first reading is always compared to the first reading to determine the pressure variance. In another example, the pressure variance is always determined by a difference between the last two previous reading. In yet another example, the pressure variance is determined by a difference between a maximum pressure reading and a minimum pressure reading in a set number of readings. So, in the example, the pressure variance for the three readings is 7 psi.

In another example, an average of all of the readings may be determined and the difference between the average and each reading may be considered the pressure variance. So, in the example with the three readings, the average would be twenty-three (23) psi such that the pressure variance between the first reading and the average reading would be three (3) psi. To this end, when an average is used, a set number of readings may be used to determine the average. For example, the set number may be ten (10) such that only the last ten reading are averaged to determine the pressure variance. In another example, a mode may be used as the comparison for the pressure reading. Thus, in the example with the three readings, the mode would be 22 psi resulting in a first pressure variance of 2 psi, a second pressure variance of zero (0) psi, and at third pressure variance of 5 psi. In another example, a standard deviation of a group of readings may be used as the pressure variance.

Once a pressure variance is determined, the radiator application may include a threshold variance. A threshold variance in one example is an arbitrary number that may be set by an input by an operator. In particular, during a trip, the pressure of a properly functioning radiator is expected to vary +/−5 psi, while a radiator that has a leak, including a cap leak, is expected to vary between +/−1 psi. So, because a factor of error can exist, in one example, the threshold variance can be between +/−2 psi. Alternatively, the threshold variance may be determined based on historical data, engine modeling, or the like. Regardless, if for a set number of readings, no pressure variance exceeds the threshold variance, an indication of a leak is presented.

For example, when the threshold variance is +/−2, and the number of readings is twenty, the pressure variance is determined based on an average of twenty readings, if the twenty readings are 20 psi, 20 psi, 21 psi, 20 psi, 19 psi, 19 psi, 21 psi, 20 psi, 21 psi, 20 psi, 20 psi, 19 psi, 20 psi, 19 psi, 21 psi, 20 psi, 20 psi, 19 psi, 20 psi, and 21 psi, the average pressure is 20 psi, with a pressure variance of +/−1 psi. Because +/−1 psi does not reach the threshold variance of +/−2 psi, a determination is made that a leak is presented.

In yet another example the threshold variance may be +/−3 psi, the number of readings is ten, and the pressure variance is determined between a maximum pressure and a minimum pressure. So, in the example, the last ten pressure readings are 22 psi, 21 psi, 18 psi, 17 psi, 19 psi, 19 psi, 19 psi, 20 psi, 20 psi, 21 psi. The pressure variance is 5 psi, meaning the threshold variance is exceeded, indicating no leak is presented. It is determined that there is no need for maintenance or repair of the radiator. Afterwards, the pressure readings continue to be obtained. Because the last ten readings are considered, if the next four readings are 20 psi, 19 psi, 21 psi, and 20 psi, the pressure variance would then be 2 psi for the previous ten readings, and the threshold variance is not exceeded. Consequently, at this time a determination is made that repair or maintenance of the radiator is needed. If this is the case, the radiator application may cause the vehicle controller to communicate with a remote controller, such as one at a maintenance location, to signal for and/or initiate the maintenance and repair.

In another example, the threshold variance may vary during a trip. In particular, a trip may include a first leg that is 6 hours before a stop occurs, and then a 3 hour second leg occurs. During the first leg, the threshold variance may be set at +/−2 psi, whereas for the 3 hour second leg, the threshold variance may be set at +/−1 pounds per square inch (psi). Depending at least in part on trip related factors, such as on the length of the trip, the threshold variance may vary more. This may be because the longer a trip occurs, the more variance may be expected.

In yet another example, an artificial intelligence (AI) algorithm, machine learning (ML) algorithm, or the like utilizes a learning function to identify patterns in pressure readings for an individual vehicle system. Instead of utilizing historical data, the one or more processors may track the pressure changes over time for the individual vehicle to determine if the pressure changes correlate with previous pressure readings and changes. The AI and/or ML algorithm may determine if anomalies are presented based on deviation rate of change from the pressure readings. The AI and/or ML algorithms may also consider variables such as weather conditions including temperature, humidity, precipitation or the like, environmental conditions, route conditions including whether the vehicle system is on an incline or decline, on a straightaway or curve, in a tunnel, etc., operational characteristics including the amount of time operating, vehicle speed, number of accelerations and decelerations, etc. or the like. Based on these variables, the AL and/or ML algorithms may make determinations that include variable threshold variances that depend on the variables. For example, a threshold variance when going up an incline may be set at +/−3 psi, whereas when going down a decline only +/−2 psi.

For each example, pressure variance may be used to determine whether a radiator, including a radiator cap is leaking during a trip. This includes leaking as a result of a cracked, broken, malfunctioning radiator container, a cracked, broken, malfunctioning radiator cap, a cracked, a radiator cap that is not properly sealed in the container, a radiator cap that is loose, another condition of the radiator container, radiator cap, or otherwise that results in leakage, or the like. By determining leakage is present during a trip, the radiator may be repaired before significant damage to the radiator or engine can occur.

The control system may include a remote controller 316 that is in communication with the vehicle controller. Each remote controller can include one or more processors 318 (microprocessors, integrated circuits, field programmable gate arrays, etc.), a memory 320, which may be an electronic, computer-readable storage device or medium, a transceiver 322 that may communicate with the monitoring controller, an input device 324 and an output device 326. The input device may be an interface between an operator, or monitor, and the one or more processors. The input device may include a display or touch screen, input buttons, ports for receiving memory devices, etc. In this manner, an operator or monitor may manually provide parameters into the vehicle controller, including vehicle parameters, route parameters, and trip parameters.

Figure 4:
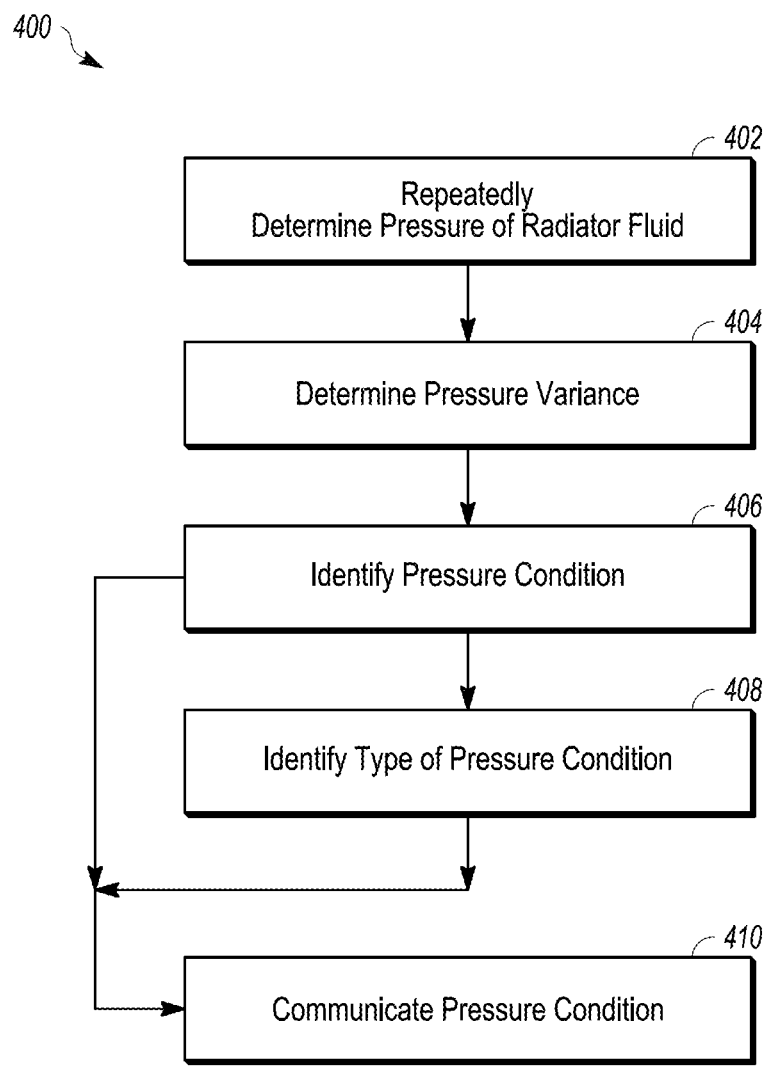
FIG. 4 is a block flow diagram of a method of identifying and repairing a malfunctioning radiator of a vehicle system.

FIG. 4 illustrates a process 400 for identifying a radiator leak of a vehicle system. In one example, the vehicle system is the vehicle system of FIG. 1, while the radiator is the radiator of FIG. 2. Similarly, the process may be implemented utilizing the control system as illustrated in relation to FIG. 3. In addition, in one example, the vehicle system is a rail vehicle system.

At step 402, the pressure of radiator fluid may be continuously determined. In one example, the pressure is continuously determined during a determined time period. The determined time period may be based at least in part on the length of a time for a trip from a starting location to an ending location. A trip may occur between any two locations, including a starting location and an ending location. In other embodiments, the pressure of the radiator fluid may be continuously determined during a trip, or the pressure of the radiator fluid may be determined using one or more observation windows. Observation windows may be differentiated by revolutions per minute (RPM) values in one example. Others may be based on operational parameters of the vehicle. Depending on the end use requirement, there may be several factors that are used to determine when pressure readings are obtained. Suitable determined time periods may be 1 hour, 2 hours, 5 hours, 12 hours, 24 hours, or the like. Suitable factors may include a vehicle steady state operation, operation on zero grade, the load or unload status of the vehicle, the ambient conditions, the rate of change of the vehicle speed, the absolute vehicle speed, a health status of the vehicle, and the like.

At step 404, a pressure variance may be determined. The pressure variance may be determined over a determined time period, or during a trip. The pressure variance may be the difference between a maximum and minimum pressure reading, a standard deviation related to a set of pressure readings, a difference from an average of the pressure readings, or the like. In particular, when no leakage occurs during a trip, the pressure variance of the radiator fluid should vary based on numerous factors. However when a leak is occurring, pressure is lost, resulting in little to no variance in fluid pressure. Therefore, pressure variance over time is indicative of a leak in the radiator, including in the radiator cap.

At step 406, a pressure condition is identified based on the pressure variance determined. A pressure condition may be identified when the pressure variation is impaired, or does not vary in the manner expected during operation. In one example, the pressure condition is determined by determining a threshold variance has not been exceeded during a trip or time period. The threshold variance is a variance that is less than the expected variance and indicative of a leak in the radiator. In one example, when an expected pressure variance is +/−5 psi, the pressure variance may be +/−1 psi. Therefore, when the threshold variance is not exceeded during a period of time, during a trip, etc. a pressure condition that is indicative of a leak has been identified.

At step 408, optionally, a type of pressure condition may be identified based on the pressure variance. Certain leaks may have a greater effect on the pressure variance than other leaks. As an example, a leak in a radiator container may cause even less pressure variance than a crack in a radiator cap, a loose radiator cap, or the like. In this manner, once a pressure condition is identified, the pressure variance may be analyzed to determine the type of leak. So, when the pressure variance is in a range between +/−0.5 psi and +/−1 psi a leak associated with the radiator cap may be identified, whereas if the pressure variance is a range below +/−0.5 psi, a leak in the container of the radiator may be identified.

At step 410, the pressure condition may be communicated to a remote controller in response to identifying the pressure condition. In particular, once a pressure condition is identified, the pressure condition may be communicated both to an operator of the vehicle system and a remote controller. The operator may then more closely monitor the engine temperature and make decisions related to shutting the engine down to prevent engine damage. Alternatively, the operator may switch operating modes and cause the engine to operate in a different manner. Meanwhile, the pressure condition can be communicated to a remote controller such as a dispatch controller, maintenance controller, etc. that may ensure a maintenance check, a repair, etc. is undertaken at a next available maintenance location. To this end, the vehicle system may be rerouted, or scheduled maintenance moved forward to address the leak in the radiator. In this manner, the radiator leak may be checked and/or repaired as quickly as possible to improve maintenance efficiencies, while protecting the engine from overheating and other potential damage.

In one or more example embodiments a system is provided that may include a pressure sensor coupled to a radiator. The pressure sensor may generate, obtain, or determine plural pressure readings of a radiator fluid in the radiator. The system may include a vehicle controller of a vehicle system having one or more processors. The one or more processors may repeatedly determine the plural pressure readings of the radiator fluid and may determine a pressure variance of the plural pressure readings that is repeatedly determined. The one or more processors may identify a pressure condition based on the pressure variance that is determined.

Optionally, the plural pressure readings may be repeatedly obtained, generated, or determined during a time period of less than twenty-four hours. In addition, the pressure variance may be based on the plural pressure readings that are repeatedly determined within the time period. In one aspect, the pressure condition is identified by determining whether the threshold variance has not been exceeded during the time period. In another aspect, the pressure condition may be at least one of a container of the radiator fluid leaking or a radiator cap of the radiator leaking. In one example, the pressure condition may be identified by determining a threshold variance. In addition, the pressure condition may be identified by determining whether the pressure variance exceeds the threshold variance. In another example, the one or more processors may stop the vehicle system based on identifying the pressure condition.

Optionally, the one or more processors may communicate with a remote controller in response to identifying the pressure condition. In one aspect, the pressure condition may be identified by determining a threshold variance. The pressure condition may be identified by determining whether the threshold variance has not been exceeded during a trip of a vehicle that includes the radiator from a first location to a second location. Alternatively, the first location may be a starting location and the second location may be a determined distance from an ending location of the trip. In another aspect, the one or more processors may identify a type of the pressure condition based on the pressure variance.

In one or more example embodiments, a system may be provided that may include a vehicle controller of a vehicle system. The vehicle controller may include one or more processors that may determine plural pressure readings of radiator fluid in a radiator during a trip. The one or more processors may determine a pressure variance of the plural pressure readings that is repeatedly determined and identify a pressure condition based on the pressure variance that is determined during the trip.

Optionally, the trip may include a first location that may be a starting location, and a second location that may be a determined distance from an end location. In one aspect, to identify the pressure condition based on the pressure variance can include measuring an amount of time expiring between the first location of the trip and the pressure variance exceeding a threshold variance, and measuring additional amounts of time between consecutive instances of the pressure variance exceeding the threshold variance during the trip. In another aspect, the pressure condition may be identified when either the pressure variance does not exceed the threshold variance during the trip, or the additional amount of time between a final threshold variance measured and the second location exceeds a threshold time period. In one example, the one or more processors may stop the vehicle system based on identifying the pressure condition. Optionally, the radiator may be on a rail vehicle system. In another example embodiment, to identify the pressure condition may include determining a standard deviation of the pressure variance for two revolutions per minute values during the trip. In one embodiment, the processors may communicate with one of a remote controller in response to identifying the pressure condition. In one embodiment, the processors may communicate with an operator of a vehicle system that includes the radiator. In one embodiment, the processors may communicate with a back office system or cloud-based system for maintenance, servicing and fleet readiness and dispatch.

In one or more embodiments a computer implemented method may include determining plural pressure readings of radiator fluid repeatedly during a trip. The method may include determining a pressure variance of the plural pressure readings that may be repeatedly determined during the trip and identifying a pressure condition based on the pressure variance that may be determined during the trip. Optionally, the method may include, in response to identifying the pressure condition, communicating the pressure condition to a remote controller.

In some example embodiments, the device performs one or more processes described herein. In some example embodiments, the device performs these processes based on processor executing software instructions stored by a computer-readable medium, such as a memory and/or a storage component. A computer-readable medium (e.g., anon-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed:

1. A vehicle controller for a vehicle system, the vehicle controller comprising:
    a pressure sensor configured to be coupled to a radiator of a vehicle system obtain pressure readings of a radiator fluid in the radiator; and
    one or more processors that are configured to:
        determine the pressure readings of the radiator fluid;
        determine a pressure variance of the pressure readings;
        identify a pressure condition based at least in part on the pressure variance that is determined; and
        switch operating modes of an engine coupled to the radiator based at least in part on identifying the pressure condition.

2. The controller of claim 1, wherein the pressure readings are repeatedly determined during a time period of less than twenty-four hours and the pressure variance is based at least in part on the pressure readings that are repeatedly determined within the time period.

3. The controller of claim 2, wherein the pressure condition is identified by determining whether a threshold variance has not been exceeded during the time period.

4. The controller of claim 1, wherein the pressure condition is differentiated between the radiator leaking the radiator fluid and a radiator cap leaking the radiator fluid.

5. The controller of claim 1, wherein the pressure condition is identified by determining a threshold variance and determining whether the pressure variance exceeds the threshold variance.

6. The controller of claim 1, wherein the one or more processors are further configured to communicate with a remote controller having one or more processors in response to identifying the pressure condition.

7. The controller of claim 6, wherein the pressure condition is identified by determining a threshold variance and determining whether the threshold variance has not been exceeded during a trip of a vehicle of the vehicle system that includes the radiator from a first location to a second location.

8. The controller of claim 7, wherein the first location is a starting location, and the second location is a determined distance from an ending location of the trip.

9. The controller of claim 8, wherein the processors are configured to differentiate pressure conditions and to determine whether the radiator is leaking the radiator fluid or a radiator cap for the radiator is leaking the radiator fluid.

10. A system comprising:
    a pressure sensor coupled to a radiator of a vehicle system and configured to obtain pressure readings of a radiator fluid in the radiator; and
    a vehicle controller of the vehicle system having one or more processors that are configured to:
        repeatedly determine the pressure readings of the radiator fluid in the radiator during a trip based on the pressure readings;
        determine a pressure variance of the pressure readings that is repeatedly determined;
        identify a pressure condition based on the pressure variance that is determined during the trip; and
        communicate with a remote controller having one or more processors in response to identifying the pressure condition.

11. The system of claim 10, wherein the trip includes a first location that is a starting location and a second location that is a determined distance from an end location.

12. The system of claim 11, wherein to identify the pressure condition based on the pressure variance includes measuring an amount of time expiring between the first location of the trip and the pressure variance exceeding a threshold variance, and measuring additional amounts of time between consecutive instances of the pressure variance exceeding the threshold variance during the trip.

13. The system of claim 12, wherein the pressure condition is identified when either the pressure variance does not exceed the threshold variance during the trip, or the additional amounts of time between a final threshold variance measured and the second location exceeds a threshold time period.

14. The system of claim 10, wherein the one or more processors are further configured to stop the vehicle system based on identifying the pressure condition.

15. The system of claim 10, wherein the one or more processors are further configured to switch operating modes of an engine of the vehicle system based at least in part on identifying the pressure condition, and the radiator being thermally and fluidly coupled to the engine.

16. The system of claim 10, wherein the one or more processors are further configured to determine a standard deviation of the pressure variance for two revolutions per minute values during the trip.

17. The system of claim 10, the one or more processors are further configured to communicate with an operator of the vehicle system in response to identifying the pressure condition.

18. The system of claim 10, further comprising, the remote controller that includes one or more processors configured to schedule maintenance for the radiator in response to receiving a communication from the vehicle controller related to the pressure condition.

19. A computer implemented method comprising:
 obtaining, with a pressure sensor, pressure readings of radiator fluid in a radiator repeatedly during a trip of a vehicle system;
 determining, with one or more processors of a vehicle controller, a pressure variance of the pressure readings;
 identifying, with the one or more processors of the vehicle controller, a pressure condition based at least in part on the pressure variance; and
 switching, with the one or more processors of the vehicle controller, operating modes of an engine coupled to the radiator based at least in part on identifying the pressure condition.

20. The method of claim 19, further comprising communicating the pressure condition to a remote controller having one or more processors in response to the pressure condition meeting determined threshold parameters.

* * * * *